United States Patent
Hanoire et al.

(10) Patent No.: US 11,450,939 B2
(45) Date of Patent: Sep. 20, 2022

(54) MULTI-MODE AUTONOMOUS LOCALIZATION BEACON

(71) Applicant: OROLIA SAS, Guidel (FR)

(72) Inventors: Isabelle Hanoire, Ploemeur (FR); Vincent Guillemard, Lorient (FR); Michel Penn, Riec sur Belon (FR)

(73) Assignee: OROLIA SAS, Guidel (FR)

( * ) Notice: Subject to any disclaimer, the term of this patent is extended or adjusted under 35 U.S.C. 154(b) by 189 days.

(21) Appl. No.: 16/771,439

(22) PCT Filed: Nov. 16, 2018

(86) PCT No.: PCT/EP2018/081654
§ 371 (c)(1),
(2) Date: Jun. 10, 2020

(87) PCT Pub. No.: WO2019/115154
PCT Pub. Date: Jun. 20, 2019

(65) Prior Publication Data
US 2021/0075082 A1  Mar. 11, 2021

(30) Foreign Application Priority Data

Dec. 11, 2017  (FR) .................................... 1701294
Jul. 31, 2018   (FR) .................................... 1857124

(51) Int. Cl.
*H01Q 1/24* (2006.01)
*H01Q 1/08* (2006.01)
(Continued)

(52) U.S. Cl.
CPC ............... *H01Q 1/085* (2013.01); *G01S 1/04* (2013.01); *G01S 5/0231* (2013.01); *H01Q 1/241* (2013.01)

(58) Field of Classification Search
CPC .......... H01Q 1/24; H01Q 1/243; H01Q 1/288; H01Q 1/085; H01Q 9/42; G01S 5/02; G01S 5/0231; G01S 1/042; G01S 1/04
See application file for complete search history.

(56) References Cited

U.S. PATENT DOCUMENTS

| 8,103,212 | B1 * | 1/2012 | Pezeshkian | ........ H04B 7/15514 455/67.11 |
| 2015/0341860 | A1 * | 11/2015 | Lin | .................... H04W 52/0229 455/41.1 |
| 2020/0013263 | A1 * | 1/2020 | Lee | ........................ B64D 25/20 |

FOREIGN PATENT DOCUMENTS

| FR | 2604046 A1 | 3/1988 |
| FR | 2983833 A1 | 6/2013 |

(Continued)

OTHER PUBLICATIONS

English translation of the Written Opinion of the International Searching Authority dated Feb. 19, 2019 for corresponding International Application No. PCT/EP2018/081654, filed Nov. 16, 2018.

(Continued)

*Primary Examiner* — Thai Pham
(74) *Attorney, Agent, or Firm* — David D. Brush; Westman, Champlin & Koehler, P.A.

(57) ABSTRACT

An autonomous locator beacon including a protective casing having a power supply and a generator of radio signals connected to a transmit antenna for transmitting the generated signals. The transmit antenna is capable of taking a deployed position and a folded position. In the folded position, the transmit antenna is wound about the protective casing.

9 Claims, 5 Drawing Sheets

(51) Int. Cl.
   *G01S 1/04*         (2006.01)
   *G01S 5/02*         (2010.01)

(56) References Cited

FOREIGN PATENT DOCUMENTS

| GB | 2529404 | A | * | 2/2016 | ............ H01Q 1/087 |
| GB | 2529404 | A |   | 2/2016 | |
| WO | 0220344 | A1 |   | 3/2002 | |
| WO | WO-0220344 | A1 | * | 3/2002 | ........... B63C 9/0005 |

OTHER PUBLICATIONS

International Search Report dated Feb. 7, 2019 for corresponding International Application No. PCT/EP2018/051654, filed Nov. 16, 2018.
Written Opinion of the International Searching Authority dated Feb. 7, 2019 for corresponding International Application No. PCT/EP2018/051654, filed Nov. 16, 2018.

* cited by examiner

MULTI-MODE AUTONOMOUS LOCALIZATION BEACON

CROSS-REFERENCE TO RELATED APPLICATIONS

This Application is a Section 371 National Stage Application of International Application No. PCT/EP2018/081654, filed Nov. 16, 2018, which is incorporated by reference in its entirety and published as WO 2019/115154 A1 on Jun. 20, 2019, not in English.

1. TECHNICAL FIELD

The present invention relates to a location or distress beacon.

The present invention can be applied more particularly to personal locator or distress beacons that serve especially to locate a person who is lost on land.

2. PRIOR ART

It is known that when a locator beacon is activated, it works like a transmitter that continuously emits a radioelectrical distress signal enabling search-and-rescue services to locate the lost individual or individuals.

In general, when a locator beacon is activated, it emits a distress signal on the 121.5 MHz and 406 MHz frequencies.

The distress signal emitted on the 406 MHz frequency is generally picked up by the COSPAS-SARSAT system which, through a combination of geostationary satellites and low-earth-orbit and/or medium-earth-orbit satellites, determines the location of the beacon and transmits the coordinates to the rescue center closest to the area in which the beacon is situated.

The COSPAS-SARSAT system is a system of satellites designed to provide alert and location information intended to assist search-and-rescue operations that use space instruments and ground installations to detect and locate the signals from the distress beacons emitting on the 406 MHz frequency.

In certain situations, the distress signal sent out on the 121.5 MHz frequency is used by search-and-rescue teams when they are in an area in order to precisely locate the beacon emitting the distress signal.

Prior-art locator or distress beacons include the category of personal locator beacons designated by the acronym "PLB".

Generally speaking, a personal locator beacon is an electronic device comprising a protective casing that houses a generator of radio signals and power supply means coupled to the signals generator.

Besides, such a beacon comprises means for activating/deactivating the radiosignals generator as well as means for viewing the functional condition of the beacon that are conventionally disposed in the protective casing.

The beacon additionally comprises an antenna for the transmission of the generated signals. In a first prior-art solution, this antenna is disposed entirely and permanently within the protective casing.

However, this solution requires the implementing of a small-sized antenna, and this restricts the transmission frequency of the beacon (since the frequency transmitted depends on the size of the antenna of the beacon).

To resolve this problem, a known solution consists in implementing an antenna that can take a folded position within the protective casing when the beacon is not activated and a deployed position outside the casing when the beacon is activated.

However, this solution is not ergonomical because it requires partial dismantling of the protective casing or the removal of a cover in order to enable the antenna to be extracted by hand.

Besides, personal locator beacons can include means for retrieving geolocation data that are generated by means of a satellite positioning system commonly designated by the acronym GNSS for Global Navigation Satellite System.

The implementing of such means for retrieving geolocation data enables the speedy and precise location of the beacon, thus accelerating the rescue operation.

However, the energy consumption of such means for retrieving geolocation data is high, and this reduces the autonomy of the beacon.

To resolve this problem, it has been proposed to implement additional power supply batteries. However, this solution takes up space and weighs down the beacon.

There is therefore a need to further improve personal distress or locator beacons by especially optimizing their compactness, weight, autonomy and ergonomy.

3. SUMMARY OF THE INVENTION

To this end, the invention proposes an autonomous locator beacon comprising a protective casing comprising power supply means and a generator of radio signals connected to a transmit antenna for transmitting the generated signals, said transmit antenna being capable of taking a deployed position and a folded position.

According to the invention, in the folded position, said transmit antenna is wound about said protective casing.

Winding the transmit antenna directly about the protective casing makes a user capable of using the locator beacon with only one hand.

The activation of the location beacon is thus made easier, and this is so even for a user with limited physical capacities.

Unlike prior-art solutions which require a partial dismantling of the casing or the opening of a protective cover of the antenna so as to extract the antenna disposed within it, the ergonomy of the locator beacon is improved.

Thus, the beacon compliant with the invention is compact, ergonomical and has improved autonomy.

Such a beacon is suited to civilian and military applications.

According to one particular embodiment of the invention, the power supply means comprise at least one battery and at least one ultracapacitor.

This is useful when the battery or batteries are faulty or when their level of charge is low.

This ultracapacitor or these ultracapacitors improve the autonomy of the beacon especially when the remaining charge of the battery or batteries is low, for example below a threshold value ranging from 5% to 15%, i.e. 10%.

In a known way, such ultracapacitors are capable of storing electrical energy speedily and of redistributing it when necessary. Such ultracapacitors thus act like rechargeable batteries that take over from the battery or batteries of the beacon or assist them.

According to one particular embodiment, said at least one battery is situated in a housing of the protective casing that is tightly sealed off by a detachable lid, the lid being covered by a portion of the transmit antenna when this antenna is in the folded position.

According to one particular embodiment of the invention, the transmit antenna is constituted by a flexible metallic plate coated at least partially by a protective polymer.

The transmit antenna is capable of getting deployed like a spring.

Thus, when the antenna is no longer held in the folded position, through a blocking means for example, the transmit antenna gets automatically deployed.

Besides, the protective polymer provides the antenna with tight sealing and mechanical strength and furthermore prevents the user from getting injured when the antenna is deployed.

According to one particular embodiment of the invention, the transmit antenna is held in the folded position about the protective casing through a reversible blocking means fixedly attached to the protective casing.

Thus, the blocking means reduce the amount of space taken by the locator beacon by holding the transmit antenna, in folded position, flat against the protective casing.

According to one particular embodiment of the invention, in the position where the transmit antenna is folded about the protective casing, the blocking means cover the lid.

According to one particular embodiment of the invention, the locator beacon is configured to emit signals in secured mode at a transmission frequency of 300 to 500 MHz and in non-secured mode at a transmission frequency of 406 MHz.

The locator beacon is capable of emitting an non-secured distress signal on the international distress frequency (406 MHz) so that the signal can be picked up by the COSPAS-SARSAT satellite network, and capable of emitting a secured distress signal on adjustable frequencies so that a limited number of individuals are able to pick up the emitted signal.

Thus, the locator beacon can be configured so that the emitted distress signal can be picked up solely by a dedicated monitoring network.

According to one particular embodiment of the invention, the protective casing carries a button for the activation and deactivation of said locator beacon, said button being covered by the transmit antenna when it is in the folded position.

Such a layout minimizes the risk of accidental activation of the locator beacon.

According to one particular embodiment of the invention, the transmit antenna is mounted detachably on the protective casing.

It is thus possible, during the maintenance of the beacon especially, to remove the transmit antenna in a simple and speedy manner from the protective casing, to replace the antenna for example.

According to one particular embodiment of the invention, the transmit antenna is housed in a peripheral groove of the protective casing.

Thus, the amount of space taken up by the beacon is minimized.

The fact of housing the transmit antenna in a groove of the casing further makes it possible to minimize the risks of a deterioration of the antenna, for example because of impacts.

4. LIST OF FIGURES

Other features and advantages of the invention shall appear more clearly from the following description of a particular embodiment given by way of a simple, illustratory and non-exhaustive example and from the appended drawings, of which.

5. DETAILED DESCRIPTION OF THE INVENTION

5.1. General Principle

The invention proposes to wind the transmit antenna of a locator beacon about the protective casing in folded position, the antenna getting deployed by spring effect.

This approach enables the transmit antenna to be deployed and the beacon to be activated with only one hand.

The activation of the locator beacon implementing such an antenna is easy, and this is so for a user whose physical capacities are limited.

5.2. Description of One Embodiment

Figure 1:
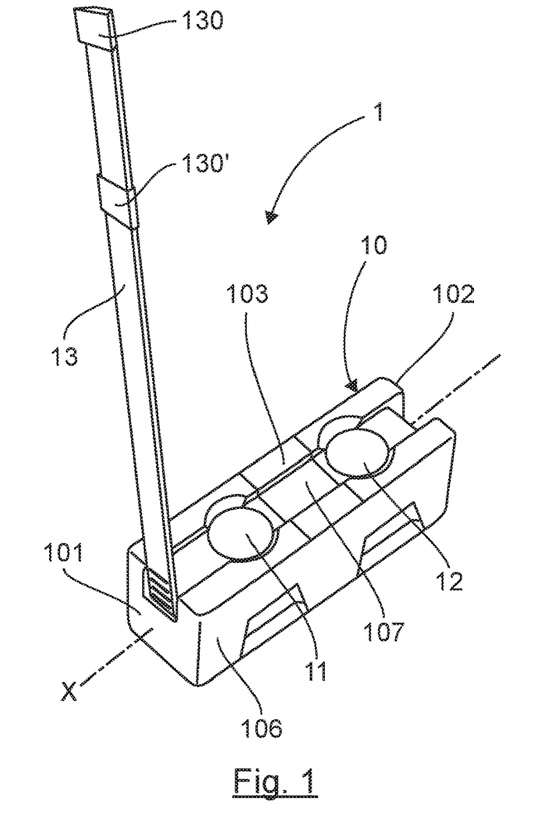
FIG. 1 illustrates an autonomous locator beacon according to one embodiment of the invention, the antenna of which is in a deployed position.

FIG. 1 illustrates a locator beacon according to one embodiment of the invention showing the antenna in deployed position.

The multi-mode locator beacon 1 comprises a protective casing 10 made of plastic enclosing a plurality of electronic components described in detail here below, making it possible especially to provide for the functioning of the locator beacon 1, namely the sending of distress signals through a radioelectrical signals generator.

More specifically, the locator beacon 1 has a first mode of operation, called a non-secured mode, and a second mode of operation, called a secured mode.

When the locator beacon 1 is in non-secured mode, the distress signals are emitted on the 406 MHz transmission frequency, corresponding to the international distress frequency, so that the signal can be picked up by the COSPAS-SARSAT satellites. The distress signal is then transmitted in a known way to the rescue services.

When the locator beacon 1 is in secured mode, the distress signals are sent out at a transmission frequency predetermined by the user and comprised between a minimum frequency and a maximum frequency.

For example, the frequency interval is 300 to 500 MHz.

Thus, only persons provided with a receiver capable of picking up distress signals emitted at a predetermined transmission frequency can come to the assistance of the beacon holder.

Such a beacon is suited especially but not exclusively to military applications.

The passage between the secured mode and the non-secured mode is obtained by a predetermined sequence of pressing on the control buttons 11, 12 disposed on the protective casing 10.

More specifically, the locator beacon 1 comprises a first button 11 for activating and deactivating the radio signals generator and more generally the locator beacon 1 and a second button 12 to carry out operations for the functional testing of the locator beacon 1.

For example, when the second test button 12 is pressed for five seconds, a self-checking program of the locator beacon 1 is implemented, and this program ascertains that the device is working well or else it detects the level of charge in the battery.

Besides, the locator beacon 1 comprises a transmit antenna 13 configured to transmit the signals generated by the generator of radio signals.

When the locator beacon 1 is activated, i.e. when the generator of radio signals emits a distress signal, the transmit antenna 13 is in deployed position as illustrated in FIG. 1.

In the embodiment illustrated, the protective casing 10 has a shape where it is elongated along the longitudinal axis X and is generally parallelepiped-shaped. It has a first longitudinal extremity face 101 and a second longitudinal extremity face 102 opposite the first longitudinal extremity face 101. The first and second longitudinal extremity faces 101, 102 are rectangular and oriented perpendicularly to the longitudinal axis X so as to be parallel to each other.

The first and second extremity faces 101, 102 are connected to each other by means of four lateral faces 103, 104, 105, 106 extending along the longitudinal axis X.

Besides, the first longitudinal extremity face 101 carries the transmit antenna 13 which, in deployed position, extends crosswise to the longitudinal axis X of the locator beacon 1 and projects from an extremity of the lateral face 103 of the protective casing 10.

In deployed position, the transmit antenna 13 is intended to be oriented vertically upwards.

The lateral face 103 thus corresponds to the upper face of the protective casing 10, the side face 105 opposite the side face 103 corresponding to the lower face of the protective casing 10.

The first button 11 for the activation and deactivation of the beacon and the second test button 12 are disposed in depressions made on the upper face 103 of the protective casing 10.

More specifically, the control buttons 11, 12 are disposed at the bottom of a groove 107 made partly in the upper face 103 and extending along the longitudinal axis X.

Such a layout of the activation/deactivation buttons 11 and of the testing button 12 reduces the risks of involuntary pressure on one of the buttons which could prompt the accidental emitting of a distress signal.

Figure 2A:
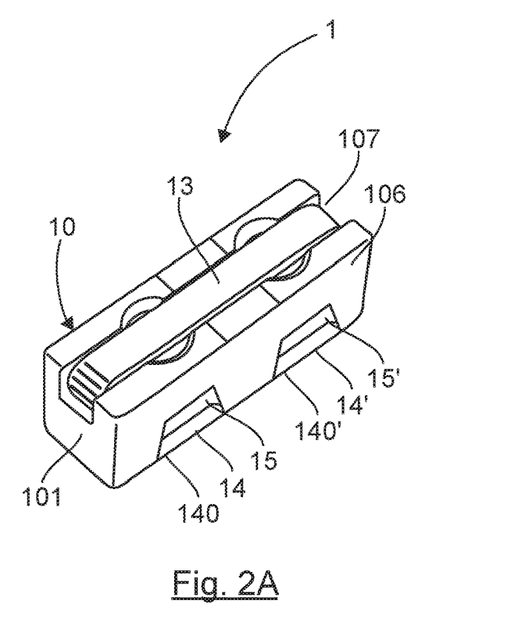
FIGS. 2A and 2B are different views of the locator beacon of FIG. 1 showing the antenna in a folded position.
Figure 2B:
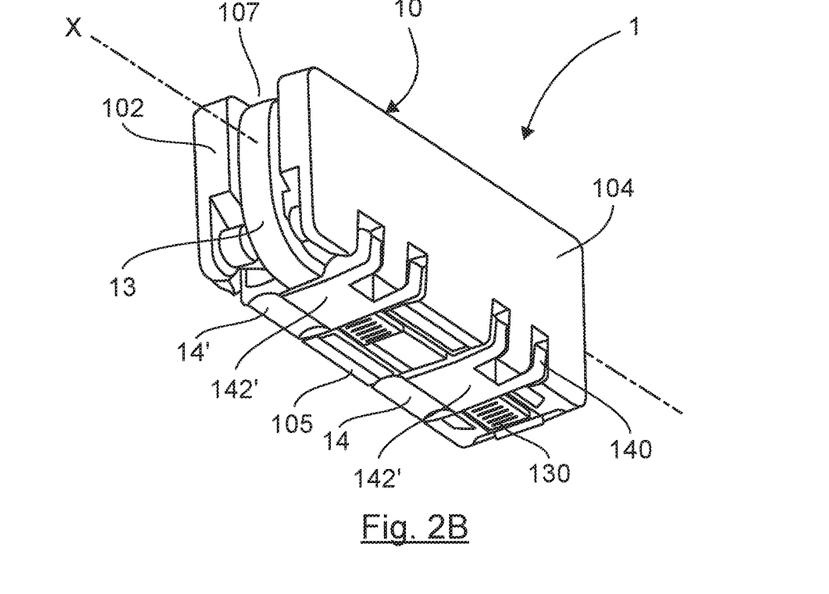

FIGS. 2A and 2B illustrate the locator beacon 1 along different viewpoints when the transmit antenna 13 is in folded position.

The transmit antenna 13 is a flexible metallic strip coated with a protective polymer.

The flexible metallic strip enables the antenna to behave like a spring. Thus, when no constraint is applied to the transmit antenna 13, it gets deployed rectilinearly.

The protective polymer, a fluorosilicone for example, provides hermetic sealing and mechanical strength to the transmit antenna 13 and furthermore prevents the user from getting injured when the antenna is deployed.

According to the invention, the transmit antenna 13 is wound about the protective casing 10 in folded position and is held in this position through blocking means 14 mounted on the protective casing 10 taking the form of tabs.

These blocking means 14, 14' are reversible so as to be able to release the transmit antenna 13 which then gets deployed solely when the locator beacon 1 has to be activated.

When the transmit antenna 13 is in the folded position and held wound about the protective casing 10 by blocking means 14, 14', these means are flush with the faces of the protective casing 10 so as to minimize the amount of space taken up by the locator beacon 1.

In the embodiment illustrated, the transmit antenna 13 is sized between 25 and 30 cm.

The length of the transmit antenna 13 is such that, in the folded position, its unattached end (opposite the end attached to the protective casing 10) is placed flat against the lower face 105 of the protective casing 10.

More specifically, the transmit antenna 13 is disposed and housed in folded position within the groove 107 extending on the first longitudinal extremity face 101, the upper face 103, the second longitudinal extremity face 102 and the lower face 105 of the protective casing 10. The transmit antenna 13 covers the control buttons 11, 12 in this folded position, thus preventing any accidental activation of these buttons.

Once the transmit antenna 13 is folded about the protective casing 10, the blocking means 14, 14' get positioned above the transmit antenna 13 at the level of the lower face 105 so as to immobilize the unattached extremity of the antenna.

Such a layout provides for the totality of the transmit antenna 13 to be housed within the groove 107 made on the rim of the protective casing 10.

Besides, the transmit antenna 13 comprises two overthicknesses or bulges forming stops 130, 130' that are laid out, when the antenna is folded, to come into contact against the blocking means 14, 14' respectively. Such stops ensure that the antenna does not slide towards the interior of the groove 107 and remains locked in a folded position.

Figure 3:
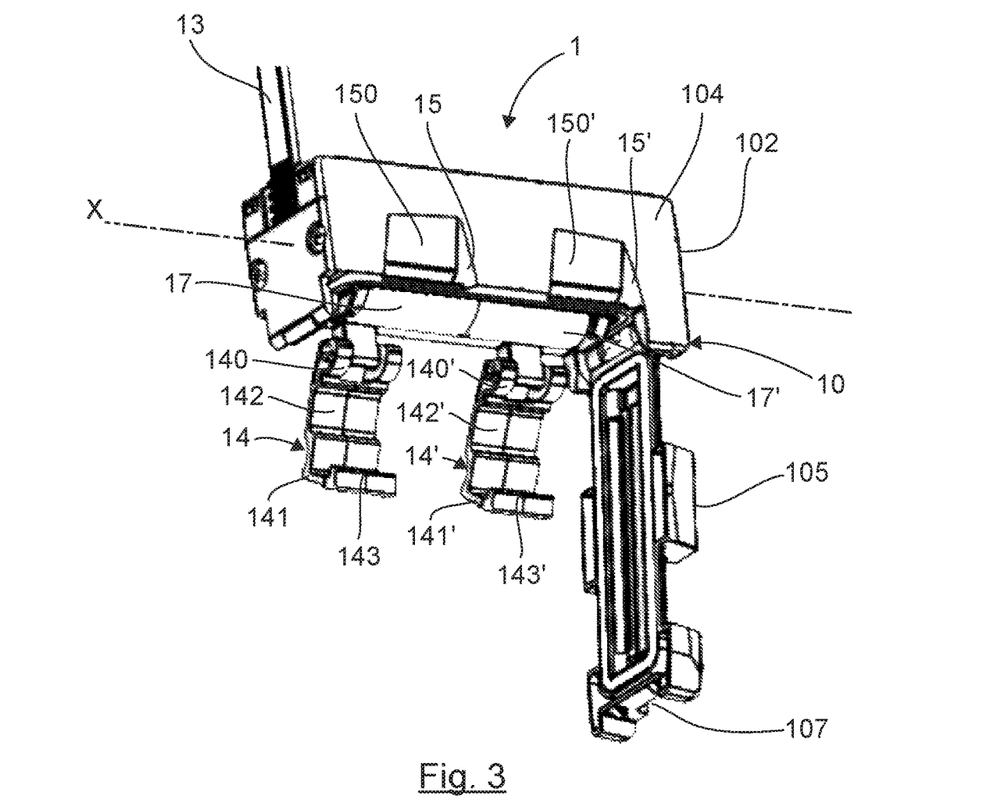
FIG. 3 is a bottom view in perspective or three-quarter view of the beacon of FIG. 1 showing the access to the electrical power supply means.

As illustrated in FIGS. 2A and 2B and described in detail in FIG. 3, the blocking means 14, 14' take the form of two identical blocking tabs each respectively comprising a first extremity portion 140, 140', a second extremity portion 141, 141' and a central portion 142, 142' situated between the first extremity portion 140, 140' and the second extremity portion 141, 141'.

The first extremity portions 140, 140' are mounted pivotingly on the first side 104 of the protective casing 10 about an axis parallel to the longitudinal axis X.

The blocking tabs 14, 14' are configured so that they can be folded down against the lower face 105 of the protective casing 10.

Besides, first clip-on means 143, 143' are made on the second extremity portions 141, 141' of the blocking tabs 14, 14' respectively and are configured to cooperate with the second complementary clip-on means 150, 150' disposed within two housings 15, 15' made on the second side 106 of the protective casing 10.

When the first clip-on means 143, 143' cooperate with the second clip-on means 150, 150', the transmit antenna 13 is held in a folded position by means of the blocking tabs 14, 14' and the stops 130, 130' of the antenna.

The implementing of such pivoting blocking tabs 14, 14' enable the transmit antenna 13 to rapidly pass from the folded position to the deployed position.

Figure 4:
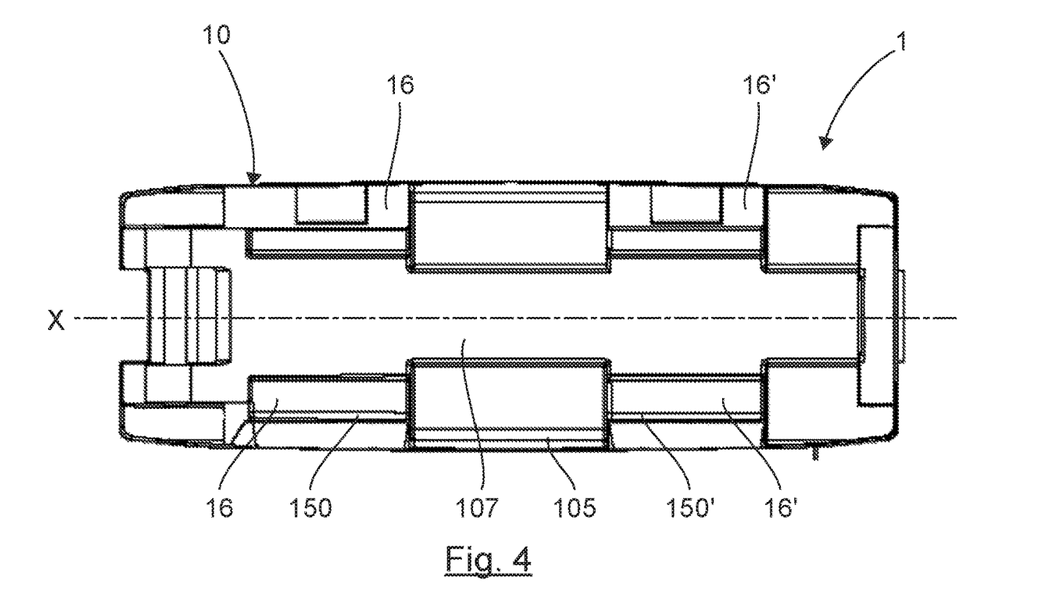
FIG. 4 is a bottom view of the locator beacon of FIG. 1.

The lower face 105 of the protective casing 10 has two hollows 16, 16' that are visible in FIG. 4, enabling the passage of the blocking tabs 14, 14' respectively when they are folded down on the lower face 105 of the protective casing 10.

Such a layout of the blocking tabs 14, 14', the housings 15, 15' and the hollows 16, 16' minimizes the amount of space taken up by the locator beacon 1. When the blocking tabs 14, 14' are folded down on the lower face 105 of the protective casing 10, the blocking casings 14, 14' are flush, enabling the locator beacon 1 to preserve its parallelepiped shape.

In FIG. 3, we can distinguish the electrical power supply means of the locator beacon 1 according to the proposed technique.

The protective casing 10 has a tightly sealed housing, intended for receiving the batteries 17, 17', that is closed off by a cover 105 forming the lower face 105 of the protective casing 10 when it is closed.

The hood 105 is mounted pivotingly about a perpendicular axis perpendicular to the axis X and is held in a closed position by a locking means (not shown) as well as the blocking means 14, 14' which get positioned above the external face of the cover 105. It is on this external face of the cover 105 that the groove 107 for receiving the antenna in the folded position is made in part.

Such a configuration simplifies the replacement of batteries 17, 17' because no specific tool is needed to unlock the blocking means 14, 14' and open the hood 105.

Besides, the cover 105 remains always fixedly attached to the protective casing 10 even during the replacement of the batteries 17, 17' thus preventing the loss of the cover 105.

Figure 5A:
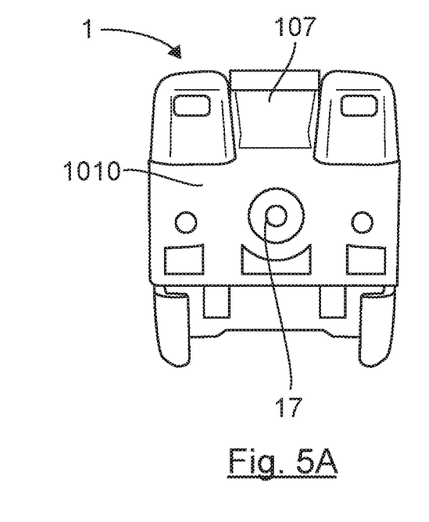
FIGS. 5A to 5C are side views of the locator beacon of FIG. 1 illustrating the means for affixing the transmit antenna.
Figure 5B:
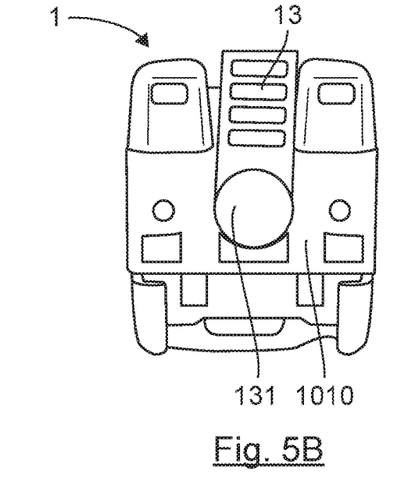
Figure 5C:
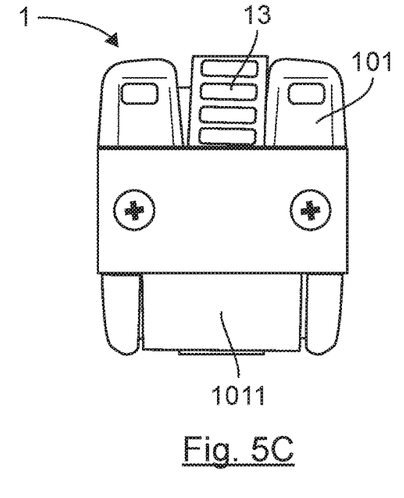

FIGS. 5A to 5C are views of the first longitudinal extremity face 101 of the protective casing 10 illustrating the means for affixing the transmit antenna 13 to the protective casing 10.

The locator beacon 1 comprises first affixing means 17 for affixing the transmit antenna 13 (FIG. 5A). The first affixing means 17 are configured to receive second complementary affixing means 132 carried by an extremity 131 called an extremity for coupling the transmit antenna 13.

In the embodiment illustrated, the first affixing means 17 are disposed within a cavity 1010 made in the first longitudinal extremity face 101 of the protective casing 10.

Figure 6:
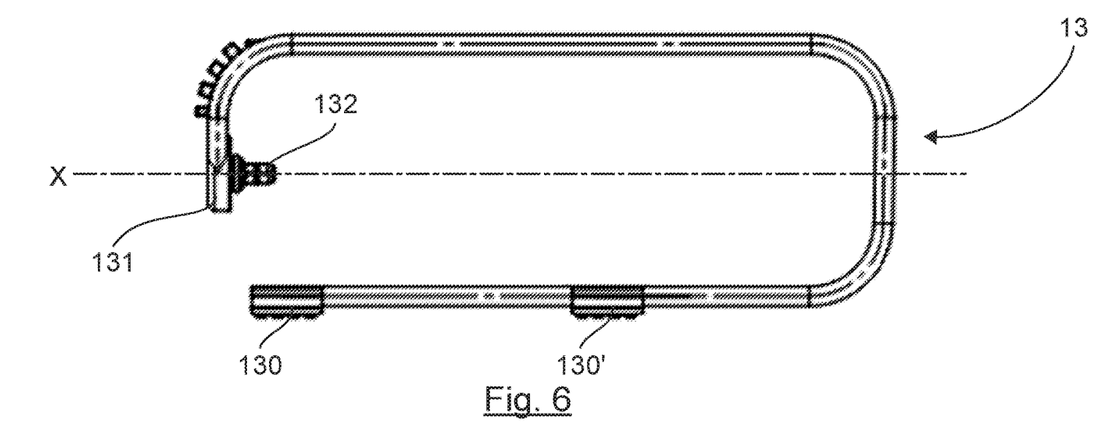
FIG. 6 is a view of the transmit antenna alone in folded position.

These first affixing means 17 take the form of a clip-on hole and the second affixing means 132 take the form of a clip-on pin, visible in FIG. 6, that gets housed in the clip-on hole mentioned here above (FIG. 5B).

FIG. 6 is a view of the transmit antenna 13 alone, in a folded position.

A detachable protective lid 1011 closes off the cavity 1010 and covers the coupling extremity 131 of the transmit antenna 13 so as to ensure the coupling of the affixing means 17, 132 (FIG. 5C).

The protective lid 1011 is affixed to the protective casing 10 through detachable locking means such as screws. This detachable protective lid 1011 is configured to be flush with the surface of the first longitudinal extremity face 101.

Figure 7:
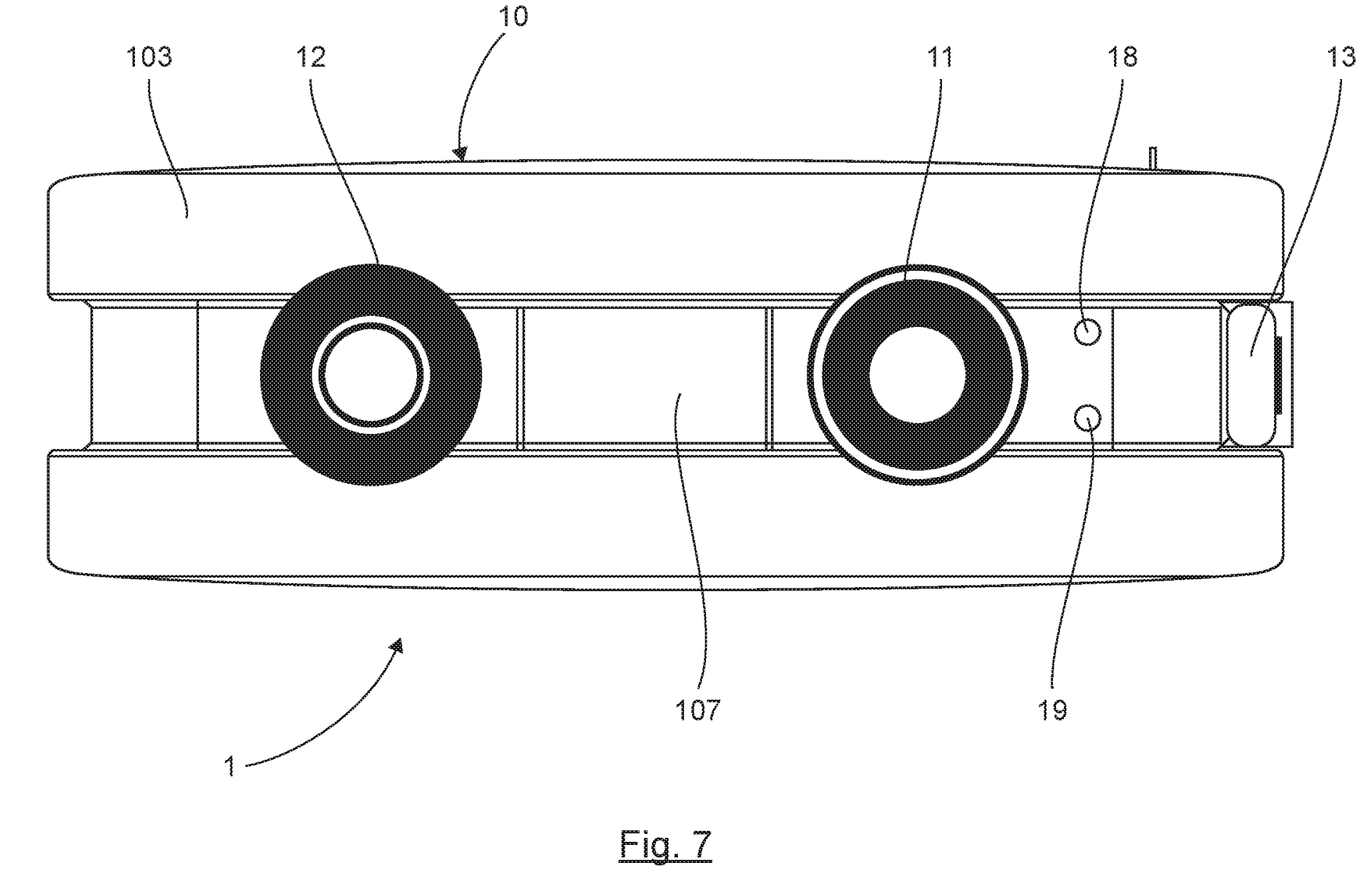
FIG. 7 is a top view of the locator beacon of FIG. 1.

FIG. 7 is a top view of the locator beacon 1.

As explained here above, the first button 11 enables the user to activate and turn off the locator beacon 1 and the second button 12 enables the user to carry out tests.

For example, by pressing the second button 12 for five seconds, the user can start a self-testing sequence for the locator beacon 1. Such a sequence is carried out by a program that analyses the functioning of the equipment, or else checks the level of charge in the batteries.

To activate the locator beacon 1, the user deploys the transmit antenna 13 and presses on the first button 11 for at least five seconds. To deactivate the locator beacon 1, the user presses on the first button 11 for at least five seconds.

The transmit antenna 13 gets deployed by spring effect after the unlocking of the two blocking means 14, 14' of the antenna in folded position.

The locator beacon 1 furthermore comprises light-emitting means 18, 19 such as two-colored LEDs by which the user can be informed about the functional state of the beacon.

The first light-emitting means 18 are representative of the mode of operation selected. For example, the first light-emitting means 18 emit a blue light in the non-secured mode and a red light in the secured mode of transmission.

The second light-emitting means 19 indicates the functional state of the locator beacon 1, namely the transmission quality, the GPS status, the result of the operating test, abnormal functioning of the beacon, etc.

Each piece of information n the functioning status is represented by a color and/or a distinctive sequencing of activation of the second light-emitting means 19.

Besides, the protective casing 10 comprises a USB connector (not visible) enabling especially the setting of parameters and the performance of test operations on the locator beacon 1.

In the embodiment illustrated, the USB connector is disposed beneath a tightly sealed protective lid disposed on the upper face 103 of the protective beacon 10.

The invention is not limited to the beacon described with reference to FIGS. 1 to 7.

Thus, such a transmit antenna that is foldable about the protective casing can be mounted on other personal locator beacons or distress beacons that serve especially to locate a person who is lost on land or at sea.

Figure 8:
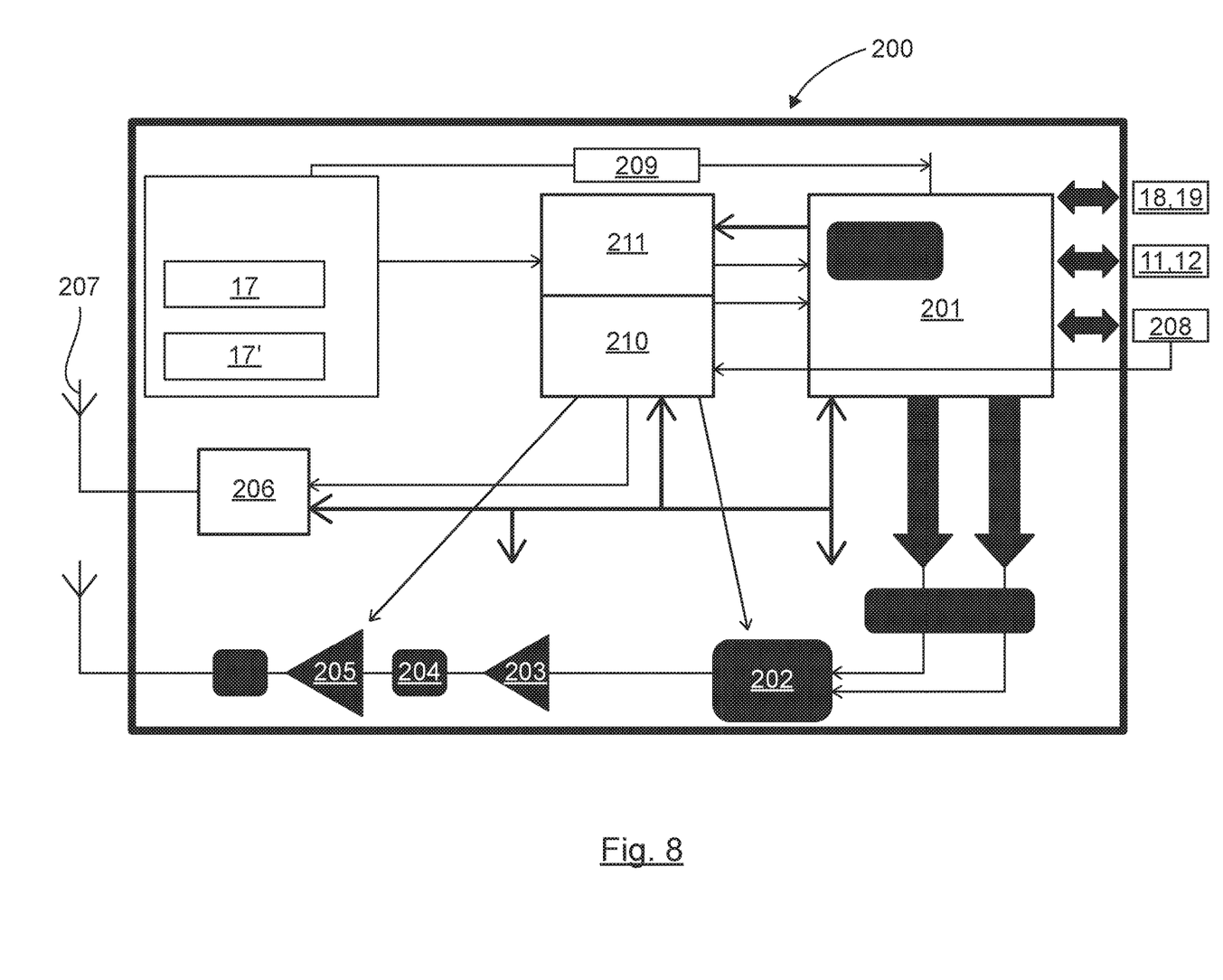
FIG. 8 is a block diagram of the main components of a locator beacon according to one particular embodiment of the invention.

FIG. 8 is a block diagram of the main components of a locator beacon according to one particular embodiment of the invention.

The operation of the locator beacon is performed by a plurality of electronic components disposed on at least one electronic board disposed within the protective casing 10, comprising especially:
- a central processing 201 such as a microprocessor or microcontroller, configured to receive data, process them and ensure the control of the functions of the beacon,
- a modulator 202, configured to generate distress signals,
- a first oscillator 203, configured to provide frequencies for emitting the distress signals on secured and non-secured modes to a frequency synthesizer 204, and a second oscillator 205 configured to stabilize the frequencies;
- a reception module 206 configured to retrieve GNSS (GPS, GLONASS, Galileo, Beidou for example) geo-locating data and transmitting them to them to the central processing unit 201,
- a reception antenna 207, internal to the protective casing, configured to detect only GNSS frequencies (and minimize interference),
- control buttons 11, 12 configured to activate/deactivate the modulator 202 and test the working of the locator beacon,
- a light-emitting means 18, 19 configured to send out a visual signal representative of the state of operation of the locator beacon,
- a USB connector 208 configured to set the parameters of the locator beacon,
- batteries 17, 17' configured to supply energy to the set of electronic components of the beacon, a capacitor 209, configured to provide for the continuity of the electrical power supply of the central processing unit 201, in alleviating voltage decreases or drops in the batteries 17, 17' so as to preserve the parameter settings of the clock of the central processing unit 201 especially, one or more ultracapacitors 210 configured especially to provide for the continuity of the electrical supply of the modulator 202, in alleviating voltage decreases or drops in voltage in the batteries 17, 17', and a direct current/direct current converter 211, configured to ensure the charging and discharging of the ultracapacitors 210.

When the locator beacon 1 is used, it can be subjected to decreases or drops in voltage coming from the deliberate or involuntary disconnection of the batteries (when they are being replaced or in the event of impacts for example).

When the batteries 17, 17' are accurately connected to the supply circuit of the locator beacon 1, they charge the ultracapacitors 210 by means of the direct current/direct current converter 211; Then, when there is a decrease or drop in voltage, the ultracapacitors 210 take over the task and get discharged into the power supply circuit of the modulator 202.

In other words, the ultracapacitors are intended to replace the batteries or to support these batteries.

In the embodiment illustrated, six three-farad ultracapacitors are implemented and serve as ultra-fast batteries.

The implementing of such ultracapacitors, capable of rendering energy, extends the autonomy of the beacon.

In addition, such ultracapacitors do away with the need to implement at least one additional battery.

Thus, the autonomy of the locator beacon is increased with no impact or little impact on its overall dimensions.

When the locator beacon is activated, i.e. when a distress signal is transmitted, the ultracapacitors get charged during the activation of the module 206 for receiving GNSS signals.

5.3. Other Aspects

To reduce the amount of space required and the weight of the beacon according to the invention, the electronic board and antenna are miniaturized (with improved ergonomics).

The distress signal emitted by the beacon of the invention makes it possible to identify the beacon that has been activated and comprises positional data obtained from a GNSS receiver disposed within the protective casing.

The locator beacon has been described when implemented in the COSPAS-SARSAT international locator system.

However, a locator beacon according to the invention can be used outside the COSPAS-SARSAT system.

In the embodiment described, the protective casing has a length of 9 to 11 cm, a width of 3 to 4 cm, and a height of 4 to 5 cm. Besides, the total weight of the locator beacon is approximately 200 g.

Such a locator beacon is easily transportable by the user and holding it in one hand is made easy.

It can be noted that the control buttons can be coated with a polymer, a flourosilicone for example, providing for tight sealing.

Besides, the means for affixing the transmit antenna to the casing are reversible so as to enable speedy and easy replacement of the transmit antenna.

In the embodiment described here above, the means for blocking the transmit antenna are carried by the protective casing.

In another embodiment not shown, the blocking means are carried by the transmit antenna.

The locator beacon according to the invention can work for a sufficient duration to enable the sending of a distress signal continuously until the arrival of assistance.

For example, when the beacon is activated, it has an autonomy of 28 to 54 hours in secured mode and 38 to 49 hours in non-secured mode.

The antenna described with reference to FIGS. 1 to 7 can be implemented on any type of personal locator beacon or distress beacon that serves especially to locate a person lost on land or at sea.

The invention claimed is:

1. An autonomous locator beacon comprising:
   a transmit antenna;
   a protective casing comprising a power supply; and
   a generator of radio signals connected to the transmit antenna for transmitting the generated signals,
   said transmit antenna being capable of taking a deployed position and a folded position, wherein, in the folded position, said transmit antenna is wound about said protective casing,
   wherein said protective casing carries a button for activation and deactivation of said locator beacon, said button being covered by said transmit antenna when the transmit antenna is in the folded position.

2. The autonomous locator beacon according to claim 1, wherein the power supply comprises at least one battery and at least one ultracapacitor.

3. The autonomous locator beacon according to claim 2, wherein said at least one battery is situated in a housing of said protective casing tightly sealed off by a detachable lid, said lid being covered by a portion of said transmit antenna when this antenna is in folded position.

4. The autonomous locator beacon according to claim 1, wherein said transmit antenna is constituted by a flexible metallic plate coated at least partially by a protective polymer.

5. The autonomous locator beacon according to claim 1, wherein said transmit antenna is held in the folded position about the protective casing through a reversible blocking element fixedly attached to the protective casing.

6. The autonomous locator beacon according to claim 1, wherein:
   said at least one battery is situated in a housing of said protective casing tightly sealed off by a detachable lid, said lid being covered by a portion of said transmit antenna when the antenna is in folded position,
   in the position where the transmit antenna is folded about said protective casing, the blocking element covers said lid.

7. The autonomous locator beacon according to claim 1, wherein the autonomous locator beacon is configured to emit signals in a secured mode at a transmission frequency of 300 to 500 MHz that can be picked up solely by a dedicated monitoring network and in a non-secured mode at a transmission frequency of 406 MHz that can be picked up by a COSPAS-SARSAT satellite network.

8. The autonomous locator beacon according to claim 1, wherein said transmit antenna is mounted detachably on said protective casing.

9. The autonomous locator beacon according to claim 1, wherein said transmit antenna is housed in a peripheral groove of said protective casing.

* * * * *